(12) United States Patent
Bates

(10) Patent No.: US 7,610,042 B2
(45) Date of Patent: Oct. 27, 2009

(54) RESENDING A MESSAGE TO A MESSAGE CENTER BASED ON A SIGNAL STRENGTH

(75) Inventor: Cary Lee Bates, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 673 days.

(21) Appl. No.: 11/423,517

(22) Filed: Jun. 12, 2006

(65) Prior Publication Data

US 2007/0287425 A1 Dec. 13, 2007

(51) Int. Cl.
*H04L 12/58* (2006.01)
(52) U.S. Cl. .................. 455/412.1; 455/412.2; 455/413; 455/414.1
(58) Field of Classification Search .............. 455/412.1, 455/412.2, 413, 414.1
See application file for complete search history.

(56) References Cited

U.S. PATENT DOCUMENTS

| | | | |
|---|---|---|---|
| 5,689,802 | A | 11/1997 | Luzzatto |
| 5,705,980 | A | 1/1998 | Shapiro |
| 5,850,593 | A | 12/1998 | Uratani |
| 5,890,054 | A | 3/1999 | Logsdon et al. |
| 5,937,355 | A | 8/1999 | Joong et al. |
| 6,895,257 | B2 | 5/2005 | Boman et al. |
| 7,130,620 | B2 * | 10/2006 | Forman et al. ........... 455/414.2 |
| 7,133,687 | B1 * | 11/2006 | El-Fishawy et al. ......... 455/466 |
| 2002/0187788 | A1 | 12/2002 | McKay |
| 2004/0203607 | A1 | 10/2004 | Satapathy |
| 2004/0203948 | A1 | 10/2004 | Provost et al. |
| 2005/0059381 | A1 | 3/2005 | Hintermeister |
| 2005/0130632 | A1 | 6/2005 | Park |

OTHER PUBLICATIONS

"Are You Ready for Multimedia Messaging Service—An Evolutionary Approach to Implementing MMS," Nokia White Paper, 2002, pp. 1-11.

* cited by examiner

*Primary Examiner*—Nick Corsaro
*Assistant Examiner*—Vladimir Magloire
(74) *Attorney, Agent, or Firm*—Owen J. Gamon

(57) ABSTRACT

In an embodiment, a message is sent from a source telephone to a message center if a message indication is received by the source telephone in response to a call from the source telephone directed to a target telephone. The message indication indicates that the target telephone does not answer the call. The message center saves the message. If a signal strength of a transmission between the source telephone and the message center during the sending of the message is below a low signal-strength threshold, then the message is recorded to an overlay message at the source telephone. Once the signal strength between the source telephone and the message center exceeds a high signal-strength threshold, an overlay package that includes the overlay message is sent from the source telephone to the target telephone, and the message center replaces the message with the overlay message if the message exists at the message center. In this way, the target telephone may retrieve the overlay message, which was sent with a greater signal strength.

15 Claims, 8 Drawing Sheets

RESENDING A MESSAGE TO A MESSAGE CENTER BASED ON A SIGNAL STRENGTH

FIELD

This invention generally relates to telecommunications and more specifically relates to resending messages from a telephone to a message center based on signal strengths.

BACKGROUND

Although cellular telephones have become very popular, they often suffer from poor reception, which is caused by low signal strength. Low signal strength can be caused by interference from buildings, hills, and electronic devices, or it can occur when the cellular telephone is located on the edge of the transmission range. Poor reception is especially a problem when the user is moving, such as when driving, because the cellular telephone signal may be within range and unobstructed one moment, but shortly thereafter the user may move into a valley, behind a building, or simply move toward the end of the range of the signal.

In order to help the user with the problem of poor reception, many cellular phones display a signal-strength indicator on a user interface. This allows the user to monitor the indicator in order to determine when the signal strength is sufficient to make a call or send a message and also to determine when the signal strength is weakening and is about to be lost. Unfortunately, monitoring the signal-strength indicator is inconvenient, distracting, and cumbersome for the user, and may even be dangerous if the user is driving a moving vehicle. Further, if the user is moving, a good signal-strength indication at the time the user looks at the indicator does not guarantee that signal strength will be adequate a short time later when the user is making the call.

Without a better way to handle poor reception and low signal strength, using a cellular telephone will continue to be inconvenient and frustrating for the user.

SUMMARY

A method, apparatus, system, and signal-bearing medium are provided. In an embodiment, a message is sent from a source telephone to a message center if a message indication is received by the source telephone in response to a call from the source telephone directed to a target telephone. The message indication indicates that the target telephone does not answer the call. The message center saves the message. If a signal strength of a transmission between the source telephone and the message center during the sending of the message is below a low signal-strength threshold, then the message is recorded to an overlay message at the source telephone. Once the signal strength between the source telephone and the message center exceeds a high signal-strength threshold, an overlay package that includes the overlay message is sent from the source telephone to the target telephone, and the message center replaces the message with the overlay message if the message exists at the message center. The low signal-strength threshold and the high signal-strength threshold are adjusted based on signal strengths of transmissions of test messages retrieved from the message center. In this way, the target telephone may retrieve the overlay message, which was sent with a greater signal strength.

DETAILED DESCRIPTION

Figure 1:
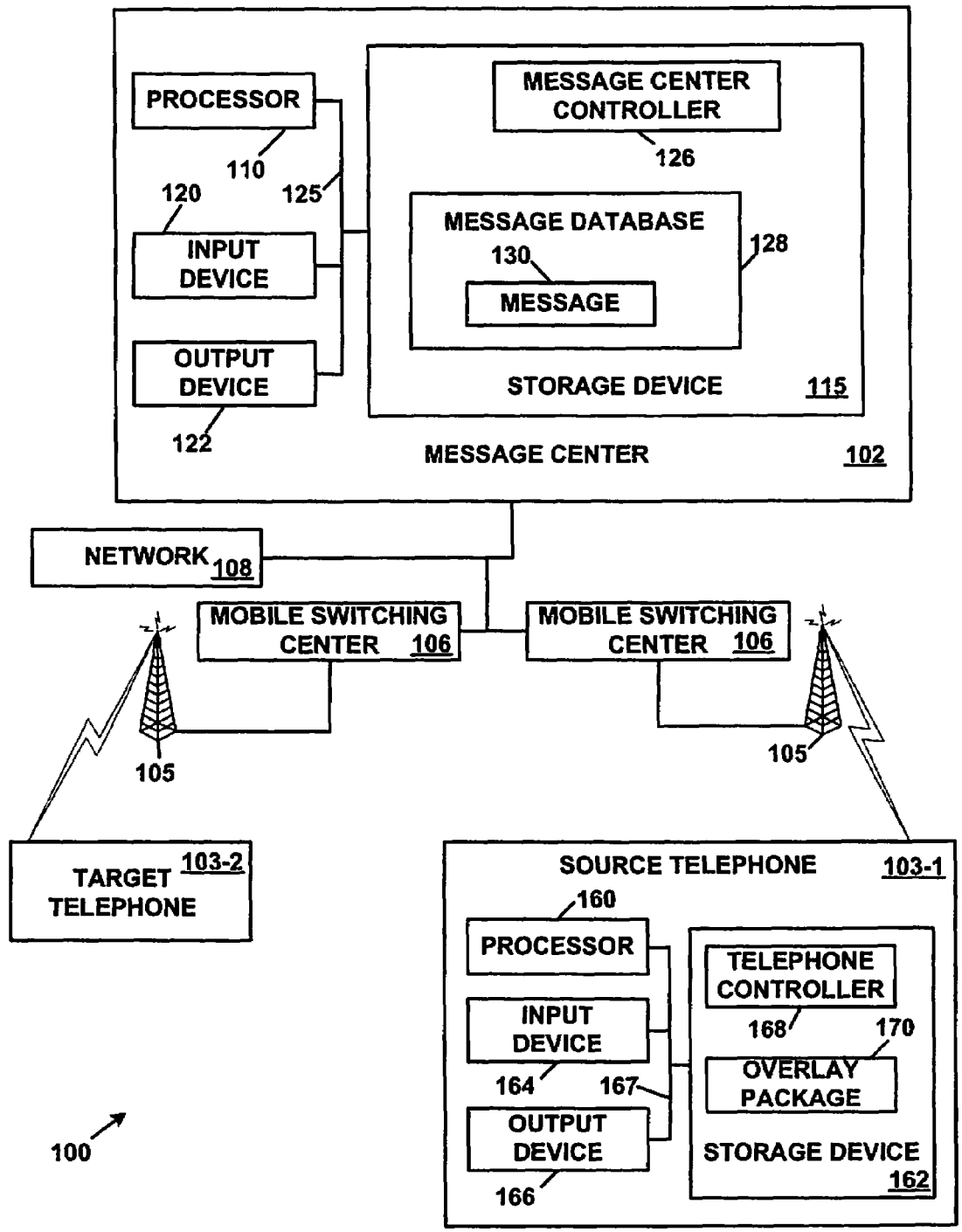
FIG. 1 depicts a block diagram of an example system for implementing an embodiment of the invention.

FIG. 1 depicts a block diagram of an example system 100 for implementing an embodiment of the invention. The system 100 includes a message center 102, a source telephone 103-1, a target telephone 103-2, antennas 105, mobile switching centers 106, and a network 108. The message center 102, the mobile switching centers 106, and the network 108 are connected either by wireless signals or hard wires. The source telephone 103-1 and the target telephone 103-2 send and receive wireless signals to and from the antennas 105. The antennas 105 are connected to the mobile switching centers 106. In another embodiment, only one of the source and target telephones 103-1 and 103-2 may communicate via wireless signal. Although only one message center 102, two telephones 103-1 and 103-2, two antennas 105, two mobile switching centers 106, and one network 108 are shown, in other embodiments any number or combination of them may be present.

The mobile switching centers 106 perform call routing, connecting calls together by switching packets from one network path to another. The mobile switching centers 106 may also register, authenticate, and update the locations of the telephones 103-1 and 103-2.

The message center 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the message center 102 that controls the operation of the entire message center. Although not depicted in FIG. 1, the processor 110 typically includes a control unit that organizes data and program storage in memory and transfers data and other information between the various parts of the message center 102. The processor 110 reads and/or writes code and data to/from the storage device 115, the network 108, the input device 120, and/or the output device 122.

Although the message center 102 is shown to contain only a single processor 110 and a single bus 125, other embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, hard disk media, floppy disk media, tape media, CD (compact disk) media, DVD (digital video disk or digital versatile disk) media, optical storage media, flash memory devices, and/or other machine-readable media. In other embodiments, any appropriate type of storage device may be used. Although only one storage device 115 is shown, multiple storage devices and multiple types of storage devices may be present. Further, although the message center 102 is drawn to contain the storage device 115, it may be external to the message center 102 and/or may be distributed across other electronic devices, such as devices connected to the network 108.

The storage device 115 includes a message center controller 126 and a message database 128. The message center controller 126 routes messages between the telephones 103-1 and 103-2 and saves and retrieves messages to/from the message database 128. In an embodiment, the message center controller 126 includes instructions capable of executing on the processor 110 or statements capable of being interpreted by instructions executing on the processor 110 to carry out the functions as further described below with reference to FIG. 6. In another embodiment, the message center controller 126 may be implemented either partially or completely in hardware via logic gates and/or other appropriate hardware techniques in lieu of or in addition to a processor-based system.

The message database 128 includes one or more messages 130 that the source telephone 103-1 sent to the message center 102 in lieu of completing a call to the target telephone 103-2 at a time when the target telephone 103-2 was unable or unwilling to receive a call. In another embodiment, the messages 130 may be any message sent between the source and target telephones. The target telephone 103-2 may optionally retrieve, save, delete, and/or forward the messages 130. The message center controller 126 organizes the messages 130 in the message database 128 by source and target. In various embodiments, the messages 130 may include audio, video, text, data, or any combination thereof. The message database is further described below with reference to FIG. 2A.

Although the message center controller 126 and the message database 128 are both illustrated as being contained within the storage device 115 in the message center 102, in other embodiments they may be on different storage devices and/or on different electronic devices and may be accessed remotely, e.g., via the network 108.

The input device 120 may be a keyboard, mouse or other pointing device, trackball, touchpad, touchscreen, keypad, microphone, voice recognition device, or any other appropriate mechanism for the user to input data to the message center 102 and/or to manipulate the user interfaces of the message center 102. Although only one input device 120 is shown, in another embodiment any number (including zero) and type of input devices may be present.

The output device 122 is that part of the message center 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number (including zero) of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The message center 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, client computers, server computers, and mainframe computers are examples of other possible configurations of the message center 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The source telephone 103-1 attempts to place a call to the target telephone 103-2. The telephones 103-1 and 103-2 are labeled "source" and "target" only to illustrate that the source telephone 103-1 attempts to place a call to the target telephone 103-2, and a telephone that is used as a source in an embodiment may be used as a target in another embodiment, and vice versa. The source telephone 103-1 includes a processor 160, a storage device 162, an input device 164, and an output device 166, all connected directly or indirectly via a bus 167. The source telephone 103-1 may further include a transmitter, an antenna, and/or a transceiver for transmitting and receiving messages and telephone calls (either partially or completely via wireless signals) to/from the message center 102 and/or the target telephone 103-2 via the antenna 105, the mobile switching center 106, the message center 102, and/or the network 108. Although the source telephone 103-1 is depicted in FIG. 1 as being a stand-alone system, in other embodiments the source telephone 103-1 may be embedded as part of another device, such as a modem, fax machine, automobile, appliance, laptop or notebook computer, pager, PDA (Personal Digital Assistant), or any other appropriate device.

The processor 160 is analogous to the processor 110 previously described above. The storage device 162 is analogous to the storage device 115 previously described above and stores or is encoded with a telephone controller 168 and an overlay package 170.

The telephone controller 168 includes instructions capable of executing on the processor 160 or statements capable of being interpreted by instructions executing on the processor 160 to carry out the functions as further described below with reference to FIGS. 3, 4, 5, 7, and 8. In another embodiment, the controller 160 may be implemented either partially or completely in hardware via logic gates and/or other appropriate hardware techniques in lieu of or in addition to a processor-based telephone.

The overlay package 170 may include a message previously sent to the message center 102 plus identifying information. The telephone controller 168 sends the overlay package 170 to the message center 102, and the message system controller 126 replaces a pre-existing message 130 with an overlay message from the overlay package 170. The overlay package 170 is further described below with reference to FIG. 2B.

The input device 164 may be a keyboard, mouse or other pointing device, trackball, touchpad, touchscreen, keypad, microphone, voice recognition device, or any other appropriate mechanism for the user to input audio, video, text, data, or any combination thereof to the source telephone 103-1 and/or to manipulate the user interfaces of the source telephone 103-1. Although only one input device 164 is shown, in another embodiment any number of input devices of the same type or of different types may be present.

The output device 166 is that part of the source telephone 103-1 that presents output to the user. The output device 166 may be a display, speaker, or any other appropriate output device or combination thereof. Although only one output device 166 is shown, in other embodiments, any number of output devices of the same type or of different types may be present.

The bus 167 is analogous to the bus 125 previously described above.

The target telephone 103-2 may be analogous to the source telephone 103-1 as previously described above and may be the same or a different type of telephone and may be connected through the same type of network 108 or a different type of network 108 as the source telephone 103-1.

The network 108 may be any suitable network or combination of networks and may support any appropriate protocol suitable for communication of data and/or code. In various embodiments, the network 108 may be a PSTN (Public Switched Telephone Network, ISDN (Integrated Service Digital Network), or FDDI (Fiber Distributed Data Interface). In various embodiments, the network 108 may support wireless communications or hard-wired communications, such as a telephone line or cable.

In another embodiment, the network 108 may support Infiniband. In another embodiment, the network 108 may support the Ethernet IEEE (Institute of Electrical and Electronics Engineers) 802.3x specification. In another embodiment, the network 108 may be the Internet and may support IP (Internet Protocol). In another embodiment, the network 108 may be a local area network (LAN) or a wide area network (WAN). In another embodiment, the network 108 may be a hotspot service provider network. In another embodiment, the network 108 may be an intranet. In another embodiment, the network 108 may be a GPRS (General Packet Radio Service) network. In another embodiment, the network 108 may be a FRS (Family Radio Service) network. In another embodiment, the network 108 may be any appropriate cellular data network or cell-based radio network technology. In another embodiment, the network 108 may be an IEEE 802.11B wireless network. In another embodiment, the network 108 may be any suitable network or combination of networks. Although one network 108 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the message center 102 and/or the source telephone 103-1, and that, when read and executed by one or more processors in the message center 102 and/or the source telephone 103-1, cause the respective electronic devices to perform the steps necessary to execute steps or elements embodying the various aspects of an embodiment of the invention.

Moreover, while embodiments of the invention have and hereinafter will be described in the context of fully functioning electronic devices, such as the message center 102 and the source telephone 103-1, the various embodiments of the invention are capable of being distributed as a program product in a variety of forms, and the invention applies equally regardless of the particular type of signal-bearing medium used to actually carry out the distribution. The programs defining the functions of this embodiment may be delivered to the message center 102 and the source telephone 103-1 via a variety of tangible signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 108.

Such tangible signal-bearing media, when communicatively coupled (directly or indirectly) to a processor and when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
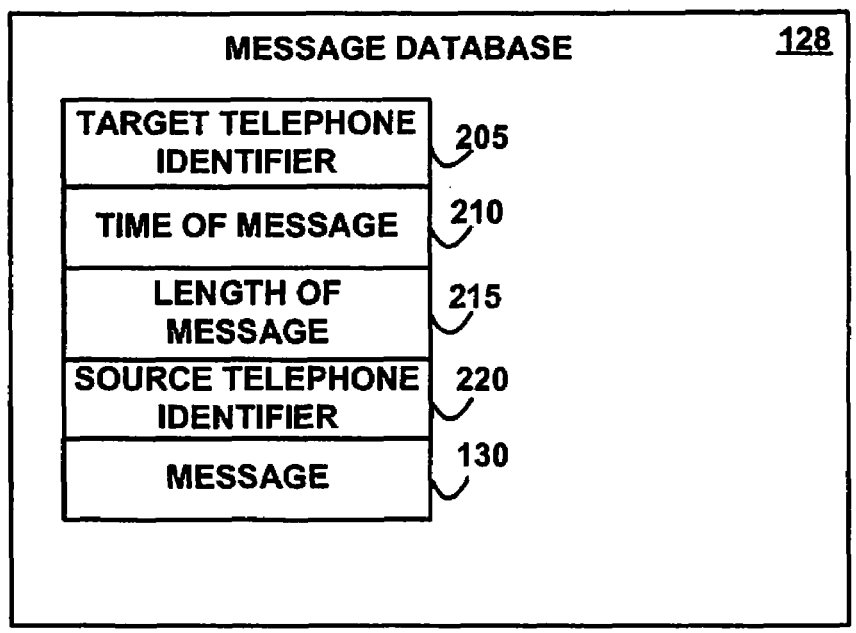
FIG. 2A depicts a block diagram of an example message database, according to an embodiment of the invention.

FIG. 2A depicts a block diagram of an example message database 128, according to an embodiment of the invention. The example message database 128 includes a target telephone identifier field 205, a time of the message field 210, a length of the message field 215, a source telephone identifier field 220, and a message field 130.

The target telephone identifier 205 identifies the target telephone 103-2 that is the target of the message 130. In an embodiment, the target telephone identifier 205 may include the telephone number of the target telephone 103-2. The time of the message 210 includes the date and/or time that the source telephone 103-1 sent the message 130 (directed to the target telephone identifier 205) to the message center 102. The length of the message 215 includes the length or amount of data in the message 130.

The source telephone identifier 220 identifies the source telephone 103-1 that sent the message 130 to the message center 102. In various embodiments, the source telephone identifier 220 includes the telephone number, the electronic serial number (ESN), or the mobile identification number (MIN) of the source telephone 103-1.

The message 130 includes message content sent by the source telephone 103-1 identified by the target telephone identifier 220 that is intended for the target telephone 103-2 identified by the target telephone identifier 205.

Figure 2B:
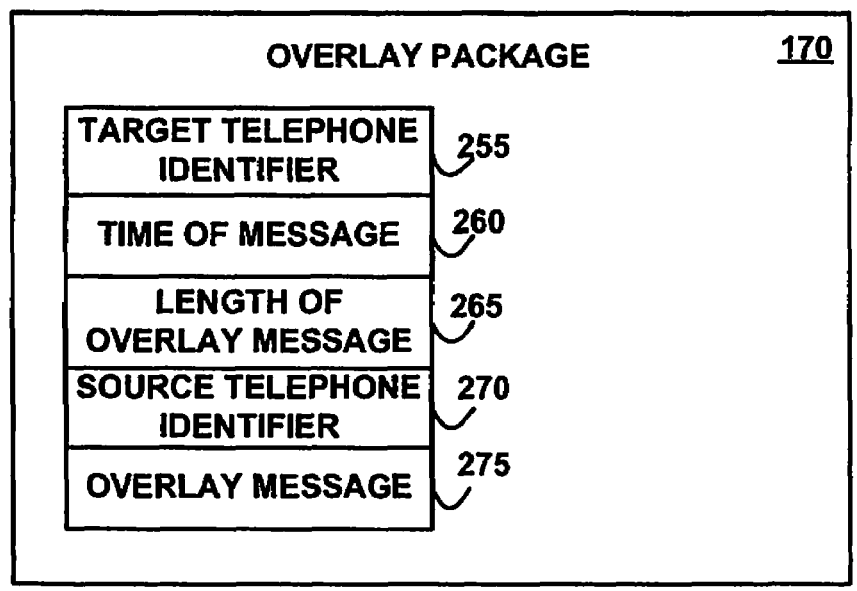
FIG. 2B depicts a block diagram of an example overlay package, according to an embodiment of the invention.

FIG. 2B depicts a block diagram of an example overlay package 170, according to an embodiment of the invention. The example overlay package 170 includes a target telephone identifier field 255, a time of the previous message field 260, a length of the overlay message field 265, a source telephone identifier field 270, and a overlay message field 275.

The target telephone identifier 255 identifies the target telephone 103-2 that was the target of the message 130, which the source telephone 103-1 previously sent. In an embodiment, the target telephone identifier 255 may include the telephone number of the target telephone 103-2. The time of the previous message 260 includes the date and/or time that the source telephone 103-1 previously sent the message 130 (directed to the target telephone identifier 255) to the message center 102. The length of the overlay message 265 includes the length or amount of data in the overlay message 275.

The source telephone identifier 270 identifies the source telephone 103-1 that sent the previous message 130 and that sends the overlay package 170 to the message center 102. In various embodiments, the source telephone identifier 270 includes the telephone number, the electronic serial number (ESN), or the mobile identification number (MIN) of the source telephone 103-1.

The overlay message 275 includes a replacement message for the previously-sent message 130. In an embodiment, the overlay message 275 and the message 130 may include identical content at the time that the source telephone 103-1 sends them, but they may include different content at the time the message center 102 receives them because of the difference in signal strengths of the different wireless transmissions at different times.

Figure 3:
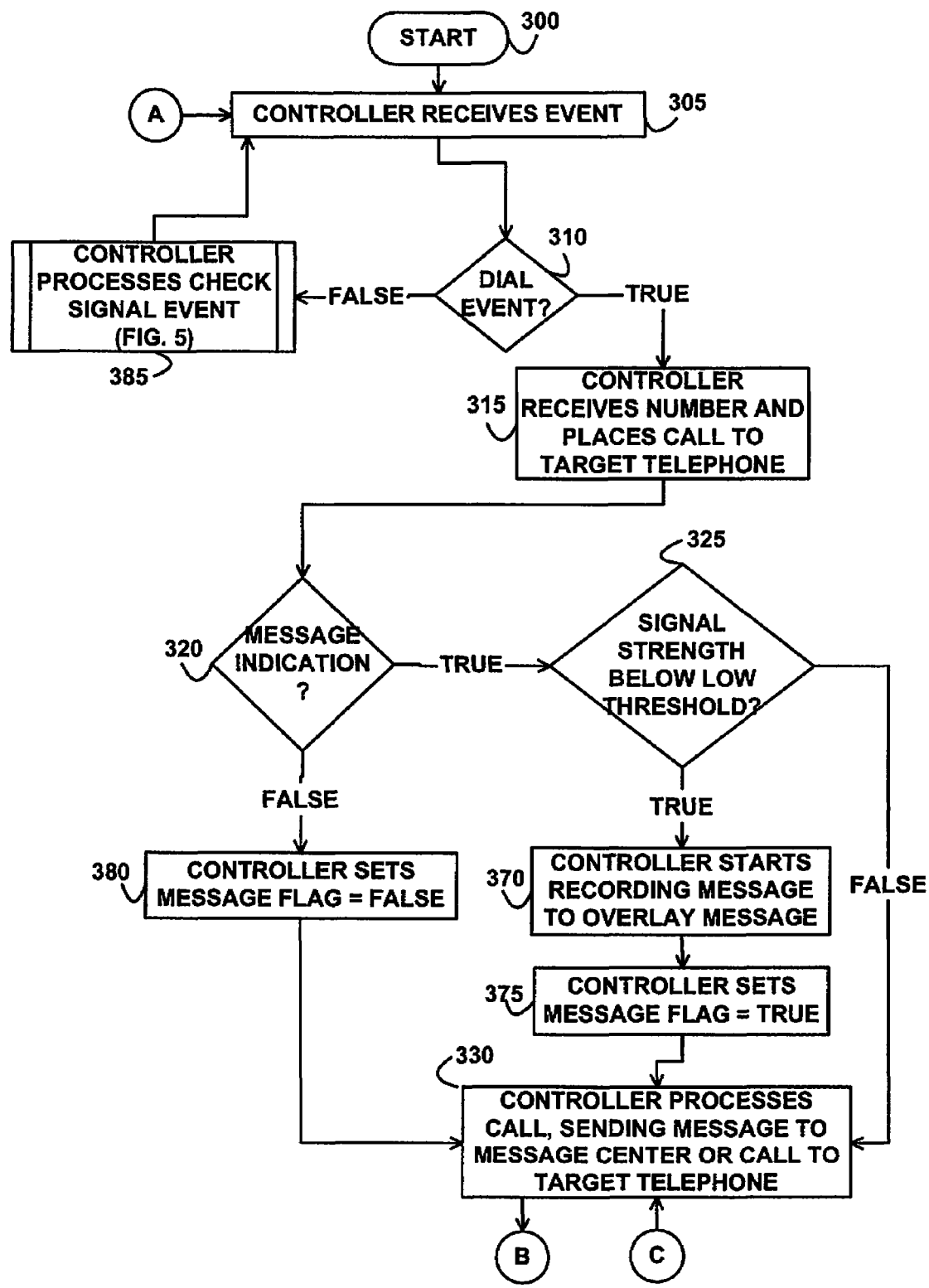
FIG. 3 depicts a flowchart of example event processing for a source telephone, according to an embodiment of the invention.
Figure 4:
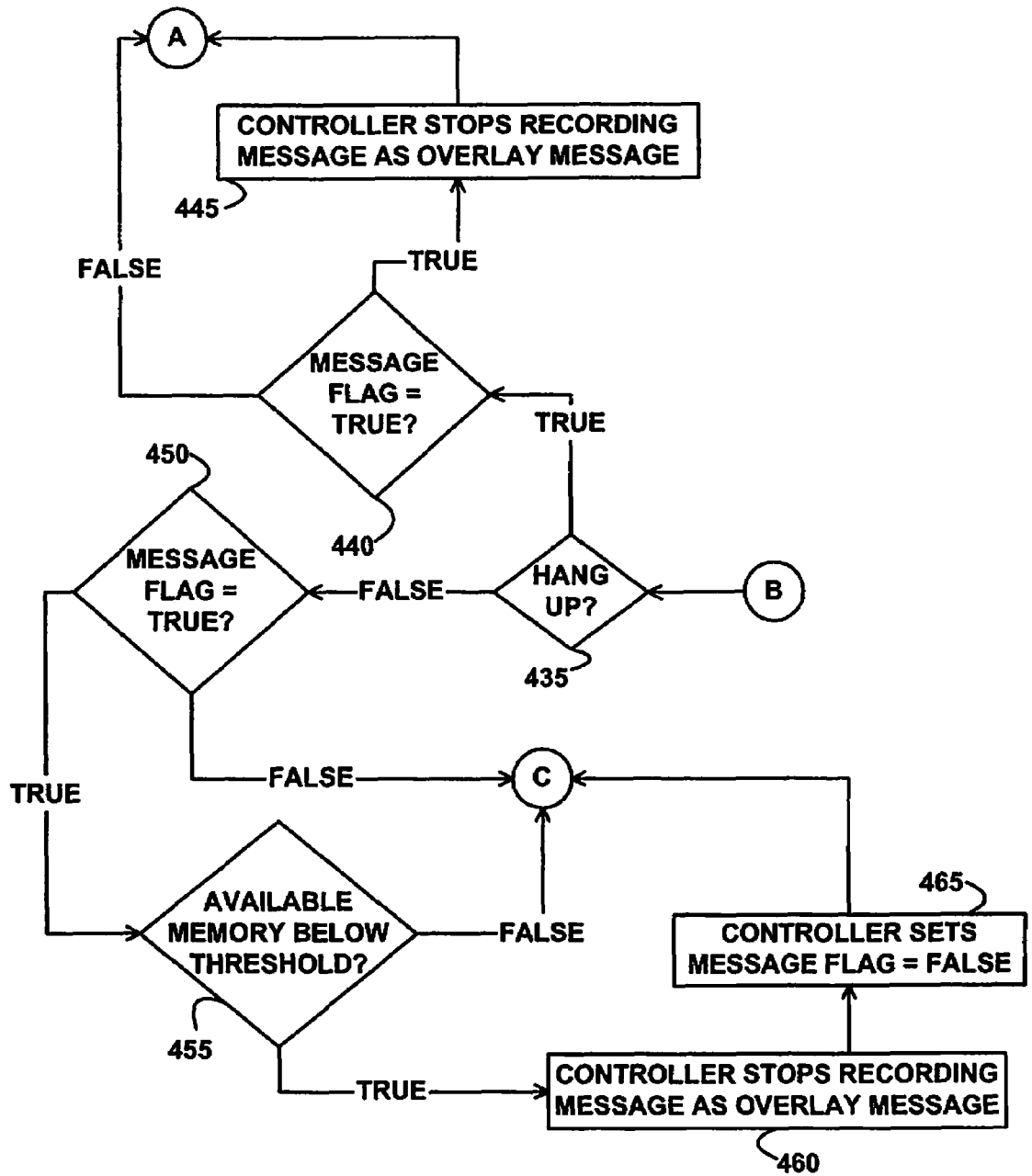
FIG. 4 depicts a flowchart of further example event processing for a source telephone, according to an embodiment of the invention.

FIGS. 3 and 4 depict flowcharts of example event processing for the source telephone 103-1, according to an embodiment of the invention. Control begins at block 300. Control then continues to block 305 where the controller 168 at the source telephone 103-1 receives an event from a component (e.g., the input device 164 or the processor 110) of the source telephone 103-1. Control then continues to block 310 where the controller 168 at the source telephone 103-1 determines whether the received event is a dial event received from the input device 164, indicating that the user of the source telephone 103-1 desires to place a call to the target telephone 103-2. If the determination at block 310 is true, then the received event is a dial event received from the input device 164, indicating that the user of the source telephone 103-1 desires to place a call to the target telephone 103-2, so control continues to block 315 where the controller 168 at the source telephone 103-1 receives the telephone number of the target telephone 103-2 from the input device 164 or determines or retrieves the telephone number from the storage device 162 and places the call directed to the target telephone 103-2.

Control then continues to block 320 where the controller 168 at the source telephone 103-1 determines whether source telephone 103-1 has received a message indication (e.g., a message tone) from the message center 102 in response to the call from the source telephone 103-1 directed to the target telephone 103-2. A message indication indicates that the target telephone 103-2 is unable to receive the call or the call is otherwise not completed and that the source telephone 103-1 may leave a message with the message center 102, which the target telephone 103-2 may retrieve later.

If the determination at block 320 is true, then the controller 168 at the source telephone 103-1 has received a message indication from the message center 102 in response to the call from the source telephone 103-1 directed to a target telephone 103-2, so control continues to block 325 where the controller 168 at the source telephone 103-1 determines whether the signal strength (the amount of energy or power) in the transmission of the message 130 between the source telephone 103-1 and the message center 102 is below a low signal-strength threshold. The low signal-strength threshold is determined and adjusted as further described below with reference to FIGS. 7 and 8.

In various embodiments, the signal strength of the transmission may include any or all of the signal strength of the transmission from the source telephone 103-1 to the antenna 105, the transmission from the antenna 105 to the mobile switching center 106, the transmission from the mobile switching center 106 to the message center 102, and any intermediate transmissions. The transmissions may include wireless transmissions, wired transmission, or any multiple or combination thereof. In an embodiment, signal strength is measured in terms of dBm (decibels above or below one milliwatt). In another embodiment, the signal strength may include a signal-to-noise ratio (SNR) (a comparison of the signal strength with the noise that is interfering).

If the determination at block 325 is false, then the signal strength of the transmission between the source telephone 103-1 and the message center 102 of the message 130 is not below a low signal-strength threshold, so control continues to block 330 where the controller 168 at the source telephone 103-1 processes the call, including sending a message 130, or a portion thereof, from the source telephone 103-1 to the message center 102, which the message center 102 saves for optional later retrieval by the target telephone 103-2. The message 130 is directed to the target telephone 103-2 and may include an identifier of the target telephone 103-2. The message 130 may further included a recorded voice message of the user of the source telephone 103-1, video, text, or any other appropriate information. Control then continues to block 435 where the controller 168 at the source telephone 103-1 determines whether the message center 102, the target telephone 103-2, or the source telephone 103-1 has hung up or terminated the call.

If the determination at block 435 is true, then a hang up occurred or the call is terminated, so control continues to block 440 where the controller 168 at the source telephone 103-1 determines whether the message flag is true. If the determination at block 440 is true, then the message flag is true and the source telephone 103-1 is currently recording an overlay message 275, so control continues to block 445 where the controller 168 at the source telephone 103-1 stops recording the overlay message 275. Control then returns to block 305, as previously described above.

If the determination at block 440 is false, then the message flag is false and the source telephone 103-1 is not currently recording an overlay message 275, so control returns to block 305, as previously described above.

If the determination at block 435 is false, then the call is still in progress, so control continues to block 450 where the controller 168 at the source telephone 103-1 determines whether the message flag is true. If the determination at block 450 is true, then the message flag is true and the source telephone 103-1 is currently recording an overlay message 275, so control continues to block 455 where the controller 168 at the source telephone 103-1 determines whether the amount of memory in the storage device 162 that is available for the overlay message 275 is below a threshold.

If the determination at block 455 is true, then the available memory is below a threshold, so control continues to block 460 where the controller 168 at the source telephone 103-1 stops recording the overlay message 275. Control then continues to block 465 where the controller 168 at the source telephone 103-1 sets the message flag to false. Control then returns to block 330, as previously described above.

If the determination at block 455 is false, then the available memory is not below a threshold, so control returns to block 330, as previously described above.

If the determination at block 450 is false, then the message flag is false and the source telephone 103-1 is not currently recording an overlay message 275, so control returns to block 330, as previously described above.

If the determination at block 325 is true, then the signal strength of the transmission of the message 130, or a portion thereof, between the source telephone 103-1 and the message center 102 is below a low signal-strength threshold, so control continues to block 370 where the controller 168 at the source telephone 103-1 starts recording the message 130 by starting to save the message 130 that the source telephone 103-1 is sending to the message center 102 to the overlay message 275. For example, the controller 168 at the source telephone 103-1 starts recording the voice, video, or data message that the user of the source telephone 103-1 is creating, which is intended for and directed to the target telephone 103-2. Thus, the controller 168 may record the message 130 to the overlay message 275 during the time that the user is creating the message 130 and the controller 168 is sending the message 130 to the message center 102.

Control then continues to block 375 where the controller 168 at the source telephone 103-1 sets a message flag to true, indicating that the source telephone 103-1 is currently recording the message 130 as the overlay message 275. Control then continues to block 330 where the controller 168 at the source telephone 103-1 processes the call, sending the message 130 to the message center 102 or sending the call to the target telephone 103-2. Control then continues to block 435, as previously described above.

If the determination at block 320 is false, then the controller 168 at the source telephone 103-1 has not received a message indication from the message center 102 in response to the call from the source telephone 103-1 directed to the target telephone 103-2, so control continues to block 380 where the controller 168 at the source telephone 103-1 sets the message flag to be false, indicating that the source telephone 103-1 is not recording an overlay message. Control then continues to block 330 where the controller 168 at the source telephone 103-1 processes the call, sending voice, audio, video, or data, to the target telephone 103-2. Control then continues to bock 435, as previously described above.

If the determination at block 310 is false, then the received event not a dial event, so control continues to block 385 where the controller 168 at the source telephone 103-1 processes the check signal event, as further described below with reference to FIG. 5. Control then returns to block 305 where the controller 168 at the source telephone 103-1 receives another event, as previously described above.

Figure 5:
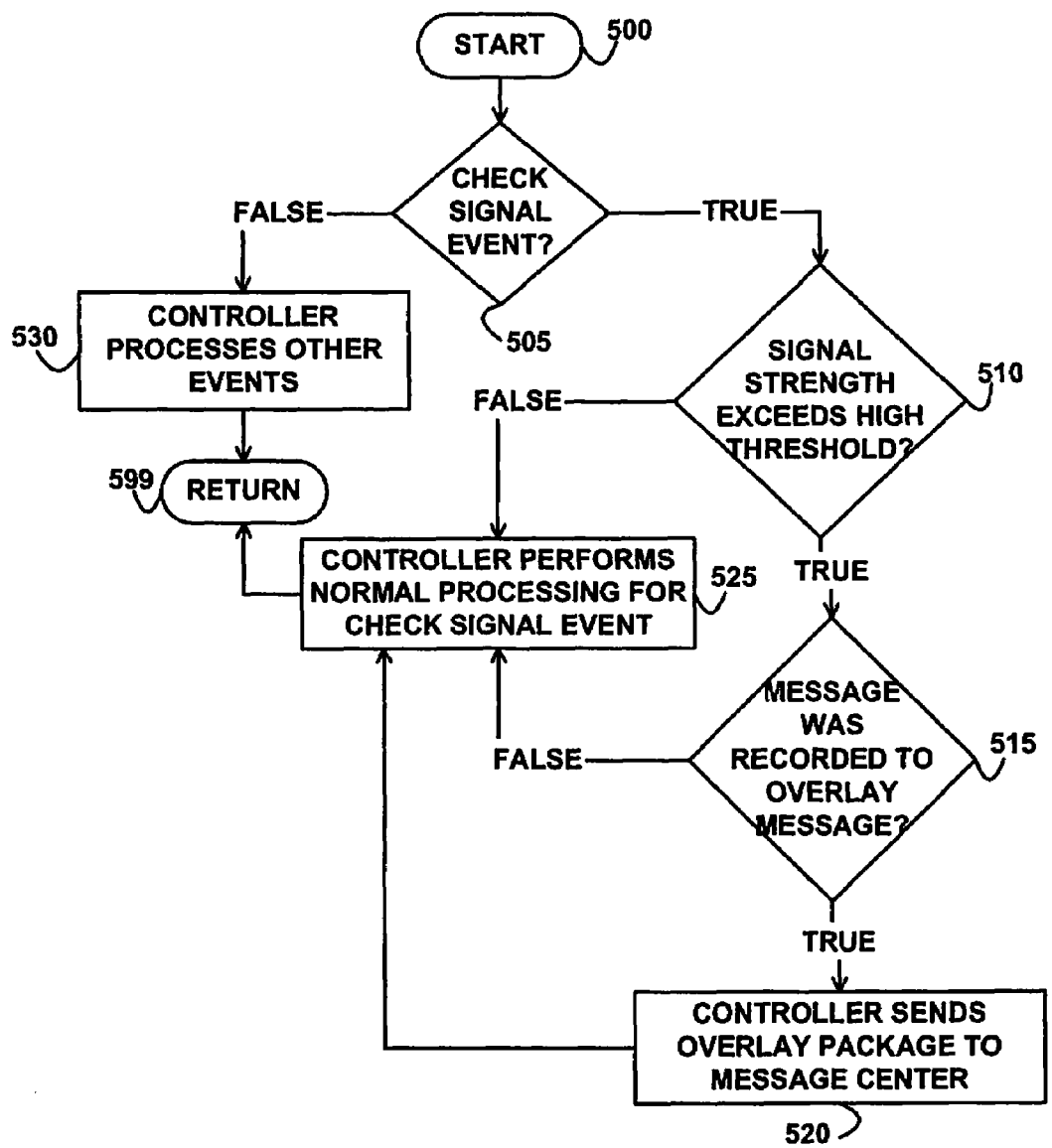
FIG. 5 depicts a flowchart of example check signal event processing for a source telephone, according to an embodiment of the invention.

FIG. 5 depicts a flowchart of example check signal event processing for a source telephone 103-1, according to an embodiment of the invention. Control begins at block 500. Control then continues to block 505 where the controller 168 at the source telephone 103-1 determines whether the received event is a check signal event. The processor 160, a clock, timer, or other device periodically sends a check signal event to the controller 168 at the source telephone 103-1.

If the determination at block 505 is true, then the received event is a check signal event, so in response to the check signal event, control continues to block 510 where the controller 168 at the source telephone 103-1 determines whether the signal strength of a transmission between the source telephone 103-1 and the message center 102 exceeds a high signal-strength threshold. The high signal-strength threshold is determined and adjusted as further described below with reference to FIGS. 7 and 8.

In various embodiments, the signal strength of the transmission may include any or all of the transmission from the source telephone 103-1 to the antenna 105, the transmission from the antenna 105 to the mobile switching center 106, the transmission from the mobile switching center 106 to the message center 102, and any intermediate transmissions. The transmissions may include wireless transmissions, wired transmission, or any multiple or combination thereof. The high signal-strength threshold represents a greater signal strength than the low signal-strength threshold.

If the determination at block 510 is true, then the signal strength of the transmission between the source telephone 103-1 and the message center 102 exceeds a high signal-strength threshold, so control continues to block 515 where the controller 168 at the source telephone 103-1 determines whether the overlay message 275 was previously recorded from the message 130 that was sent to the message center 102.

If the determination at block 515 is true, then the overlay message 275 exists and was previously recorded from the message 130 (indicating that when the message 130 was previously sent, the signal strength was below the low signal-strength threshold), so control continues to block 520 where the controller 168 at the source telephone 103-1 sends the overlay package 170, including the target telephone identifier 255, the time of the message 260, the length of the overlay message 265, the source telephone identifier 270, and the overlay message 275 to the message center 102. In an embodiment, the controller 168 at the source telephone 103-1 first sends the fields 255, 260, 265, and 270 of the overlay package 170 and waits to send the overlay message 275 until the message center 102 requests the overlay message 275 in response to receiving the fields 255, 260, 265, and 270. In another embodiment, the message center 102 may notify the source telephone 103-1 if the message 130 is retrieved or deleted by the target telephone 103-2, in which case the source telephone 103-1 does not send the overlay message 275 to the message center 102. Control then continues to block 525 where the controller 168 at the source telephone 103-1 performs normal processing for the check signal event. Control then continues to block 599 where the logic of FIG. 5 returns.

If the determination at block 515 is false, then the overlay message 275 does not exist or was not previously recorded from the message 130, so control continues to block 525, as previously described above.

If the determination at block 510 is false, then the signal strength of the transmission does not exceed the high signal-strength threshold, so control continues to block 525 where the controller 168 at the source telephone 103-1 performs normal processing for the check signal event. Control then continues to block 599 where the logic of FIG. 5 returns.

If the determination at block 505 is false, then the received event is not a check signal event, so control continues to block 530 where the controller 168 at the source telephone 103-1 processes other events. Control then continues to block 599 where the logic of FIG. 5 returns.

Figure 6:
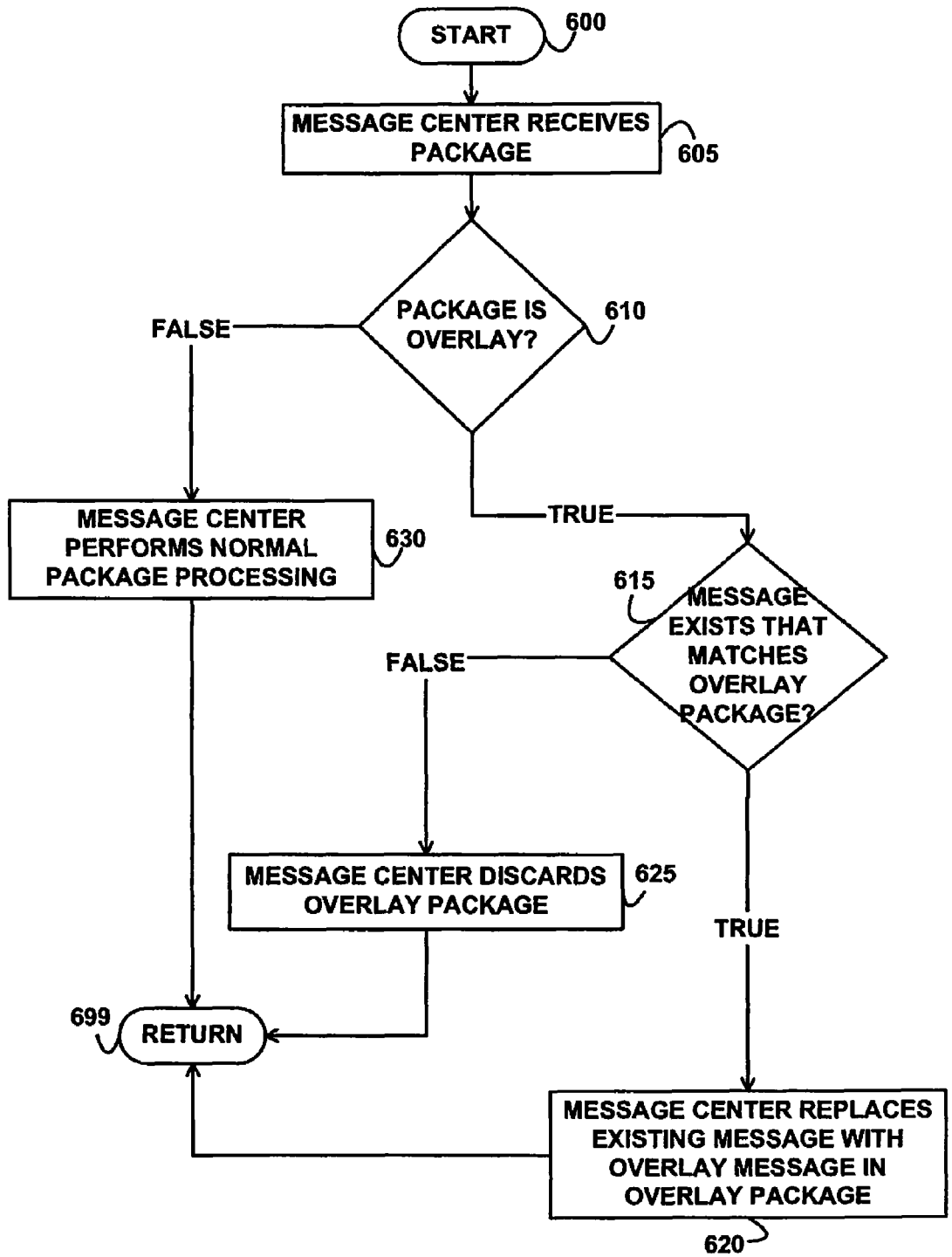
FIG. 6 depicts a flowchart of example package processing for a message center, according to an embodiment of the invention.

FIG. 6 depicts a flowchart of example package processing for the message center 102, according to an embodiment of the invention. Control begins at block 600. Control then continues to block 605 where the controller 126 at the message center 102 receives a package. Control then continues to block 610 where the controller 126 at the message center 102 determines whether the received package is an overlay package 170. If the determination at block 610 is true, then the received package is an overlay package 170, so control continues to block 615 where the controller 126 at the message center 102 determines whether a message 130 exists that matches the overlay package 170.

In various embodiments, the message 130 exists if it has not been retrieved, listened to, or deleted by the target telephone 103-2. In an embodiment, the controller 126 at the message center 102 determines if the message 130 exists at the message center 102 by determining if the source telephone identifier 270 in the overlay package 170 matches the source telephone identifier 220 of the source telephone 103-1 that sent the message 130. In another embodiment, the controller 126 at the message center 102 determines if the message 130 exists at the message center 102 by determining whether the target telephone identifier 255 in the overlay package 170 matches the target telephone identifier 205 of the target telephone 103-2 of the message 130. In another embodiment, the controller 126 at the message center 102 determines if the message 130 exists at the message center 102 by determining whether the time 260 in the overlay package 170 matches the time 210 that the message 130 was sent. In another embodiment, the controller 126 at the message center 102 further determines if the message 130 exists at the message center 102 by determining whether a length 265 of the overlay message 275 matches a length 215 of the message 130.

If the determination at block 615 is true, then a message 130 exists that matches the overlay package 170, so control continues to block 620 where the controller 126 at the message center 102 replaces the existing message 130 with the overlay message 275 from the overlay package 170. Thus, when the target telephone 103-2 later retrieves a message directed to it, the target telephone 103-2 receives the overlay message 275 instead of the message 130, where the overlay message 275 was sent from the source telephone 103-1 to the message center 102 at a greater signal strength than the message 130. In another embodiment, the controller 126 saves the overlay message 275 while also keeping the existing message 130, so that the target telephone 103-2 may later optionally receive either or both of the overlay message 275 and the existing message 130. Control then continues to block 699 where the logic of FIG. 6 returns.

If the determination at block 615 is false, then a message 130 does not exist that matches the overlay package 170, so control continues to block 625 where the controller 126 at the message center 102 discards the received overlay package 170. Control then continues to block 699 where the logic of FIG. 6 returns.

If the determination at block 610 is false, then the received package is not an overlay package 170, so control continues to block 630 where the controller 126 at the message center 102 performs normal package processing. Control then continues to block 699 where the logic of FIG. 6 returns.

Figure 7:
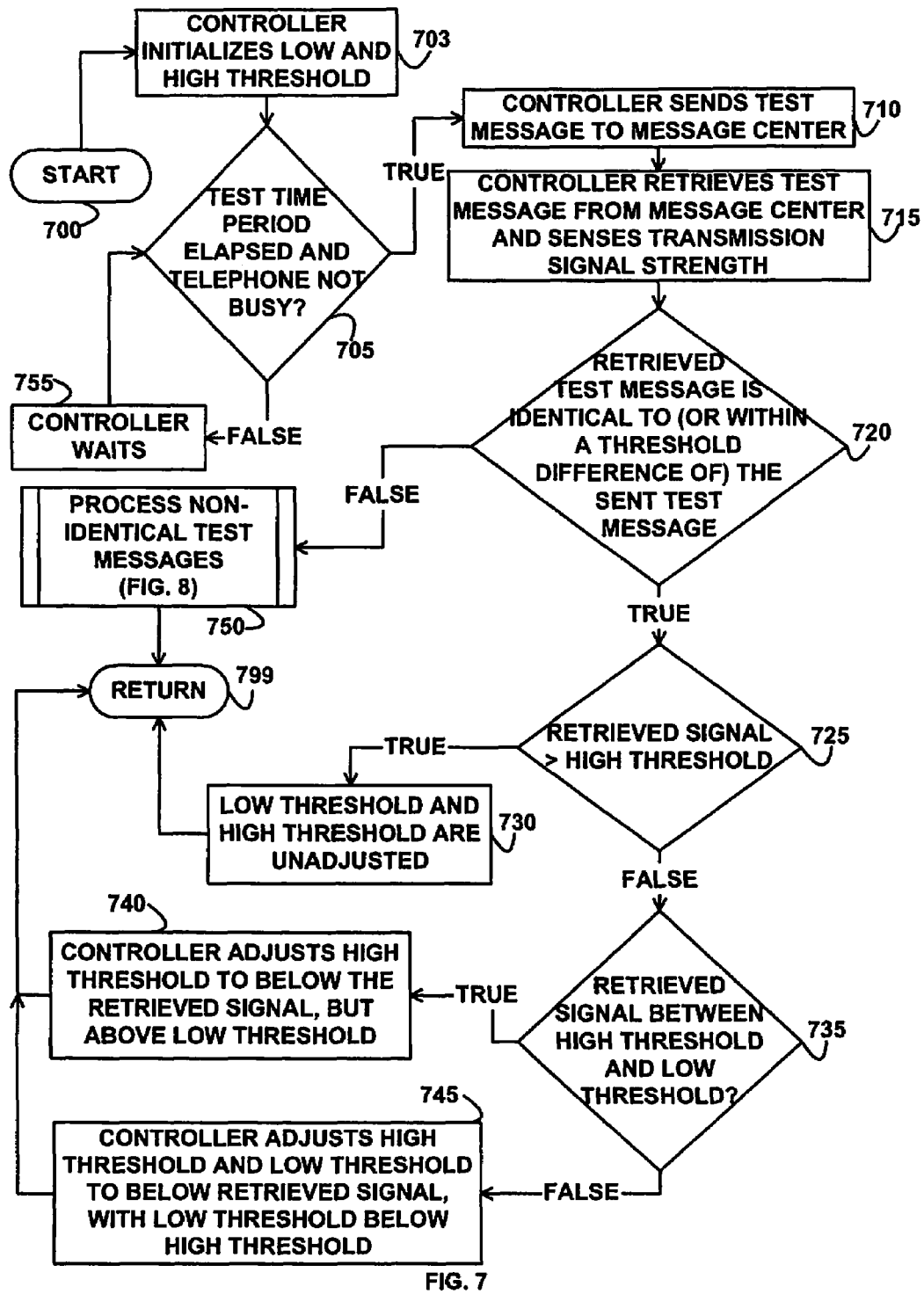
FIG. 7 depicts a flowchart of example processing for adjusting signal-strength thresholds based on test messages, according to an embodiment of the invention.

FIG. 7 depicts a flowchart of example processing for adjusting signal-strength thresholds based on test messages, according to an embodiment of the invention. Control begins at block 700. Control then continues to block 703 where the controller 168 at the source telephone 103-1 initializes the low signal-strength threshold and the high signal-strength threshold to any appropriate values, where the high signal-strength threshold is above or higher than the low signal-strength threshold.

Control then continues to block 705 where the controller 168 at the source telephone 103-1 determines whether a test time period has elapsed and the source telephone 103-1 is not busy. The source telephone 103-1 may be busy if a call is currently in progress, a message is currently being retrieved or sent, or the controller 168 at the source telephone 103-1 is performing another task. If the determination at block 705 is true, then the test time period has elapsed and the source telephone 103-1 is not busy, so control continues to block 710 where the controller 168 at the source telephone 103-1 sends a test message to the message center 102. Control then continues to block 715 where the controller 168 at the source telephone 103-1 retrieves the test message from the message center 102 and senses the signal strength of the transmission of the retrieved test message between the message center 102, the mobile switching center 106, the antenna 105, and/or the source telephone 103-1.

Control then continues to block 720 where the controller 168 at the source telephone 103-1 determines whether the retrieved test message is identical to the previously-sent test message. In an embodiment, the test message is a digital message, and the controller 168 at the source telephone 103-1 performs a bit-by-bit comparison of the sent and retrieved test messages. In another embodiment, the controller 168 at the source telephone 103-1 determines whether the retrieved test message is within a threshold difference from the sent test message, e.g., less than a threshold number of bits are different. If the determination at block 720 is true, then the retrieved test message is identical to (or is within a threshold difference of) the sent message, so control continues to block 725 where the controller 168 at the source telephone 103-1 determines whether the signal strength of the retrieved test message transmission is greater than or above the high signal-strength threshold.

If the determination at block 725 is true, then the signal strength of the transmission of the retrieved test message is greater than the high signal-strength threshold, so control continues to block 730 where the controller 168 at the source telephone 103-1 does not adjust the low signal-strength threshold or the high signal-strength threshold. Control then continues to block 799 where the logic of FIG. 7 returns.

If the determination at block 725 is false, then the signal strength of the transmission of the retrieved test message is not greater than the high signal-strength threshold, so control continues to block 735 where the controller 168 at the source telephone 103-1 determines whether the signal strength of the transmission of the retrieved test message is between the high signal-strength threshold and the low signal-strength threshold, i.e., is less than or below the high signal-strength threshold and greater than or above the low signal-strength threshold.

If the determination at block 735 is true, then the signal strength of the transmission of the retrieved test message is between the high signal-strength threshold and the low signal-strength threshold, so control continues to block 740 where the controller 168 at the source telephone 103-1 adjusts (changes) the high signal-strength threshold to be below the signal strength of the transmission of the retrieved test message, but above the low signal-strength threshold. Control then continues to block 799 where the logic of FIG. 7 returns.

If the determination at block 735 is false, then the signal strength of the transmission of the retrieved test message is below the low signal-strength threshold, so control continues to block 745 where the controller 168 at the source telephone 103-1 adjusts (changes) the high signal-strength threshold to be below the signal strength of the transmission of the retrieved test message and adjusts (changes) the low signal-strength threshold to be below the signal strength of the transmission of the retrieved test message. The controller 168 at the source telephone 103-1 ensures that the low signal-strength threshold is below the high signal-strength threshold. Control then continues to block 799 where the logic of FIG. 7 returns.

If the determination at block 720 is false, then the retrieved test message is not identical to the sent test message, or the retrieved test message is not within a threshold difference of the sent test message, so control continues to block 750 where the controller 168 at the source telephone 103-1 processes non-identical test messages, as further described below with reference to FIG. 8. Control then continues to block 799 where the logic of FIG. 7 returns.

If the determination at block 705 is false, then control continues to block 755 where the controller 168 at the source telephone 103-1 waits for a period of time. Control then returns to block 705, as previously described above. Thus, the controller 168 at the source telephone 103-1 periodically sends test messages to the message center 102, retrieves those test messages from the message center 102, compares the sent test messages to the retrieved test messages, and adjusts (changes) the high signal-strength threshold and the low signal-strength threshold based on the signal strengths of the retrieved test messages and based on the comparison of the sent test messages to the retrieved test messages.

Figure 8:
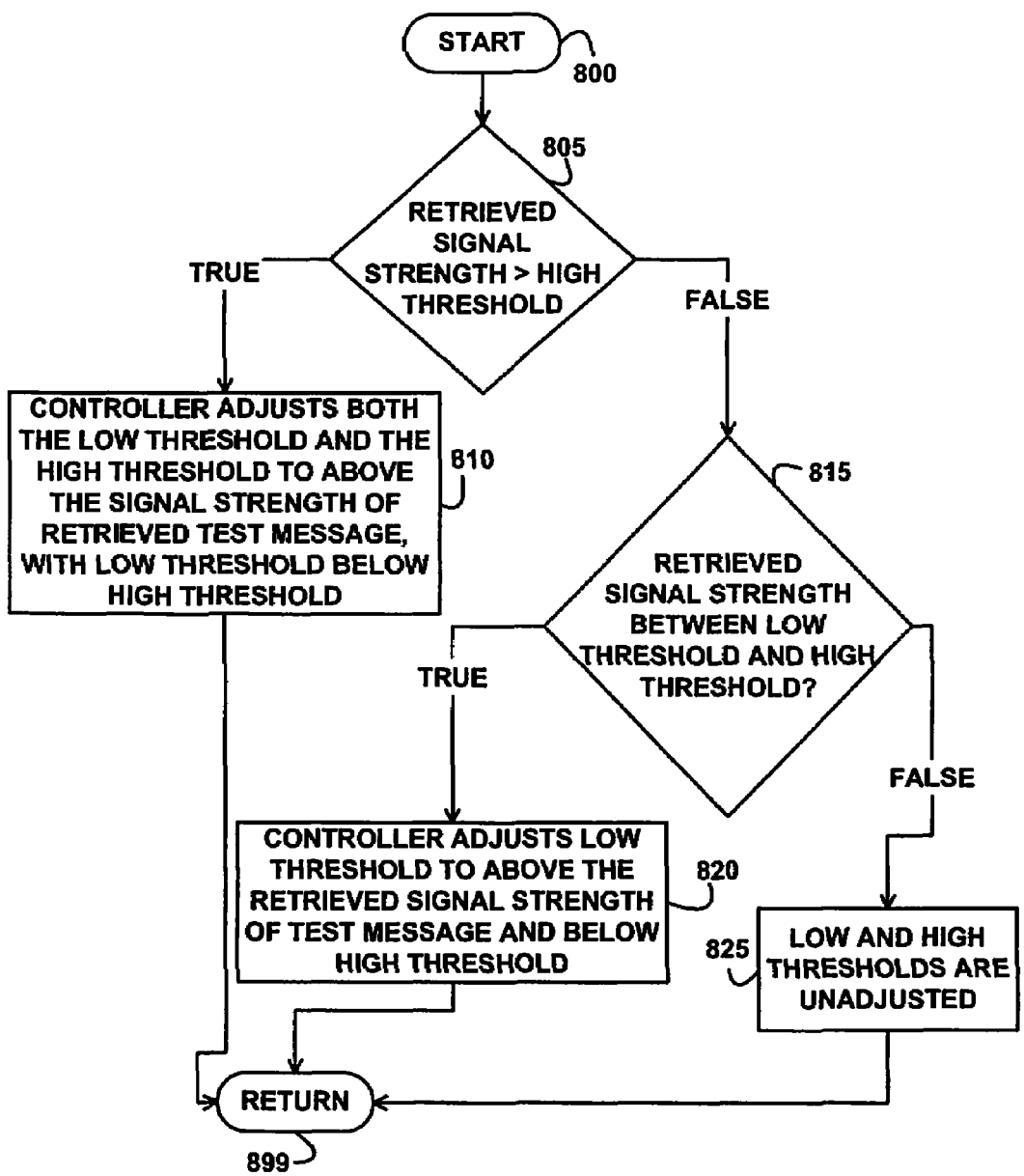
FIG. 8 depicts a flowchart of further example processing for adjusting signal-strength thresholds based on test messages, according to an embodiment of the invention.

FIG. 8 depicts a flowchart of example processing for adjusting signal-strength thresholds based on non-identical test messages, according to an embodiment of the invention. Control begins at block 800. Control then continues to block 805 where the controller 168 at the source telephone 103-1 determines whether the signal strength of the transmission of the retrieved test message is above the high signal-strength threshold. If the determination at block 805 is true, then the signal strength of the transmission of the retrieved test message is above the high signal-strength threshold, so control continues to block 810 where the controller 168 at the source telephone 103-1 adjusts (changes) both the low signal-strength threshold and the high signal-strength threshold to be above the signal strength of the transmission of the retrieved test message, where the low signal-strength threshold is below the high signal-strength threshold. Control then continues to block 899 where the logic of FIG. 8 returns.

If the determination at block 805 is false, then the signal strength of the transmission of the retrieved test message is not above the high signal-strength threshold, so control continues to block 815 where the controller 168 at the source telephone 103-1 determines whether the signal strength of the transmission of the retrieved test message is between the low signal-strength threshold and the high signal-strength threshold (i.e., above the low signal-strength threshold and below the high signal-strength threshold). If the determination at block 805 is true, then the signal strength of the transmission of the retrieved test message is between the low signal-strength threshold and the high signal-strength threshold, so control continues to block 820 where the controller 168 at the source telephone 103-1 adjusts (changes) the low signal-strength threshold to be above the signal strength of the transmission of the retrieved test message, but below the high signal-strength threshold. Control then continues to block 899 where the logic of FIG. 8 returns.

If the determination at block 805 is false, then the signal strength of the transmission of the retrieved test message is below the low signal-strength threshold, so control continues to block 825 where the low signal-strength threshold and the high signal-strength threshold are left unadjusted. Control then continues to block 899 where the logic of FIG. 8 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising: sending a message from a source telephone to a message center if a message indication is received by the source telephone from the message center in response to a call from the source telephone directed to a target telephone, wherein the message center saves the message; recording the message to an overlay message in an overlay package at the source telephone if a first signal strength of a transmission between the source telephone and the message center during the sending is below a low signal-strength threshold, wherein the overlay package further comprises: a source telephone identifier, a target telephone identifier, and a time that the message was sent to the message center; after the recording, determining whether a second signal strength between the source telephone and the message center exceeds a high signal-strength threshold; and sending the overlay package from the source telephone to the message center if the second signal strength exceeds the high signal-strength threshold and if the overlay message was recorded, wherein the message center receives the overlay package from the source telephone and replaces the message with the overlay message if the message exists at the message center, wherein the message exists at the message center if the message has not been deleted in response to a request from the target telephone.

2. The method of claim 1, wherein the message center determines if the message exists at the message center by determining whether the source telephone identifier in the overlay package matches the source telephone that sent the message.

3. The method of claim 1, wherein the message center further determines if the message exists at the message center by determining whether the target telephone identifier in the overlay package matches the target telephone of the message.

4. The method of claim 1, wherein the message center further determines if the message exists at the message center by determining whether the time in the overlay package matches the time that the message was sent.

5. The method of claim 1 wherein the message center further determines if the message exists at the message center by determining whether a length of the overlay message matches a length of the message.

6. A computer-readable storage medium encoded with instructions, wherein the instructions when executed comprise: sending a message from a source telephone to a message center if a message indication is received by the source telephone from the message center in response to a call from the source telephone directed to a target telephone, wherein the message indication indicates that the target telephone does not answer the call; recording the message to an overlay message in an overlay package at the source telephone if a first signal strength of a transmission between the source telephone and the message center during the sending is below a low signal-strength threshold, wherein the recording further comprises saving a source telephone identifier, a target telephone identifier, and a time that the message was sent in the overlay package; after the recording, determining whether a second signal strength between the source telephone and the message center exceeds a high signal-strength threshold, wherein the high signal-strength threshold exceeds the low signal-strength threshold; and sending the overlay package from the source telephone to the message center if the second signal strength exceeds the high signal-strength threshold and if the overlay message was recorded, wherein the message center saves the message, and wherein the message center receives the overlay package from the source telephone and replaces the message with the overlay message if the message exists at the message center, wherein the message exists at the message center if the message has not been deleted in response to a request from the target telephone.

7. The computer-readable storage medium of claim 6, further comprising: sending a test message to the message center; retrieving the test message from the message center; and adjusting the low signal-strength threshold and the high signal-strength threshold based on a signal-strength of a transmission of the retrieving the test message.

8. The computer-readable storage medium of claim 7, wherein the adjusting further comprises: if the signal strength of the transmission of the retrieving the test message is between the high signal-strength threshold and the low signal-strength threshold and the test message as retrieved is identical to the test message as sent, adjusting the high signal-strength threshold to below the signal strength of the transmission of the retrieving of the test message.

9. The computer-readable storage medium of claim 7, wherein the adjusting further comprises: if the signal strength of the transmission of the retrieving the test message is below the low signal-strength threshold and the test message as retrieved is identical to the test message as sent, adjusting the high signal-strength threshold and the low signal-strength threshold to below the signal strength of the transmission of the retrieving of the test message.

10. The computer-readable storage medium of claim 7, wherein the adjusting further comprises: if the signal strength of the transmission of the retrieving the test message is between the high signal-strength threshold and the low signal-strength threshold and the test message as retrieved is not identical to the test message as sent, adjusting the low signal-strength threshold to above the signal strength of the transmission of the retrieving of the test message.

11. The computer-readable storage medium of claim 7, wherein the adjusting further comprises: if the signal strength of the transmission of the retrieving the test message is above the high signal-strength threshold, adjusting the high signal-strength threshold and the low signal-strength threshold to above the signal strength of the transmission of the retrieving of the test message.

12. A source telephone comprising: a processor; and a storage device communicatively coupled to the processor, wherein the storage device is encoded with instructions, wherein the instructions when executed on the processor comprise: sending a message from a source telephone to a message center if a message indication is received by the source telephone from the message center in response to a call from the source telephone directed to a target telephone, wherein the message indication indicates that the target telephone does not answer the call, wherein the message center saves the message, recording the message to an overlay message in an overlay package at the source telephone if a first signal strength of a transmission between the source telephone and the message center during the sending is below a low signal strength threshold, wherein the recording further comprises saving a source telephone identifier, a target telephone identifier, and a time that the message was sent in the overlay package, after the recording, determining whether a second signal strength between the source telephone and the message center exceeds a high signal-strength threshold, wherein the high signal-strength threshold exceeds the low signal-strength threshold, and sending the overlay package from the source telephone to the message center if the second signal strength exceeds the high signal-strength threshold and if the overlay message was recorded, wherein the message center receives the overlay package from the source telephone and replaces the message with the overlay message if the message exists at the message center, wherein the message exists at the message center if the message has not been deleted in response to a request from the target telephone.

13. The source telephone of claim 12, wherein the message center determines if the message exists at the message center by determining whether the source telephone identifier in the overlay package matches the source telephone that sent the message.

14. The source telephone of claim 13, wherein the message center further determines if the message exists at the message center by determining whether the target telephone identifier in the overlay package matches the target telephone of the message.

15. The source telephone of claim 13, wherein the message center further determines if the message exists at the message center by determining whether the time in the overlay package matches the time that the message was sent.

* * * * *

UNITED STATES PATENT AND TRADEMARK OFFICE
CERTIFICATE OF CORRECTION

PATENT NO.        : 7,610,042 B2                                          Page 1 of 1
APPLICATION NO.   : 11/423517
DATED             : October 27, 2009
INVENTOR(S)       : Cary Lee Bates It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Twelfth Day of October, 2010

David J. Kappos
*Director of the United States Patent and Trademark Office*